United States Patent [19]
Douglas et al.

[11] 3,902,515
[45] Sept. 2, 1975

[54] PRESSURE RELIEF ARRANGEMENT FOR A HIGH PRESSURE SYSTEM

[75] Inventors: Robert M. Douglas, Harrington Park, N.J.; Hugh J. Thibodeaux; Albert Q. Butler, both of Odessa, Tex.

[73] Assignee: Dart Industries Inc., Los Angeles, Calif.

[22] Filed: May 3, 1973

[21] Appl. No.: 356,859

[52] U.S. Cl. ............................ 137/68; 220/89 A
[51] Int. Cl. ............................................. F16k 17/16
[58] Field of Search ............... 137/68, 71; 220/89 A

[56] References Cited
UNITED STATES PATENTS

| | | | |
|---|---|---|---|
| 2,640,529 | 6/1953 | MacGlashan, Jr. | 137/68 |
| 2,788,794 | 4/1957 | Holinger | 137/71 |
| 2,895,492 | 7/1959 | Bell | 137/68 |
| 3,092,286 | 6/1963 | Duff | 137/68 |
| 3,131,033 | 4/1964 | Volkenburgh | 137/68 |
| 3,493,044 | 2/1970 | Selph | 137/68 |

*Primary Examiner*—Martin P. Schwadron
*Assistant Examiner*—George L. Walton
*Attorney, Agent, or Firm*—Arthur S. Collins; Fred S. Valles; Bryant W. Brennan

[57] ABSTRACT

An improved rupture disc pressure relief arrangement for use with a high pressure vessel is described comprising a rupture disc having one surface thereof exposed to the internal high pressure of the vessel and means for establishing a variable pressure at a second surface of the disc. A disc which ruptures at a predetermined differential pressure can be employed over a relatively large range of operating pressures by varying the pressure at the second surface when changes in the operating pressure are made. The need for replacement of the rupture disc with changes in the operating pressure of the vessel is thereby avoided.

11 Claims, 4 Drawing Figures

PRESSURE RELIEF ARRANGEMENT FOR A HIGH PRESSURE SYSTEM

This invention relates to means for relieving the pressure in a vessel of a high pressure system. The invention relates more particularly to an improved rupture disc pressure relief arrangement.

In various processes, a reaction occurs in an enclosed vessel at a relatively high pressure. For example, in certain polymerization reactions, an autoclave reactor vessel is employed which is required to operate under and sustain pressures of up to about 40,000 PSI. In order to reduce the hazard and attending cost of a mishap which may accompany a runaway process condition wherein the pressure within the vessel rises rapidly to a dangerously high, self-destructive level, pressure relief arrangements have been provided which automatically relieve the pressure within the vessel when a threshold of danger pressure has been attained. One known form of pressure relief means comprises a rupture disc across which a pressure differential is established. A first surface of the disc is exposed to the internal pressure of the vessel while an opposite surface thereof is exposed to a relatively lower pressure such as atmospheric pressure. When the differential pressure across the disc exceeds an operating value by a predetermined amount, the disc will mechanically rupture and vent the vessel to the lower pressure.

In practice, it is desirable that a pressure vessel be capable of operating over a range of pressures, such as for example, 20,000 PSI to 35,000 PSI depending on the product or material which is to be produced. However, the general characteristics of a runaway reaction in a vessel utilizing a rupture disc have limited the operation to a relatively narrow range of pressures. It has been found that the pressure increase in a runaway reactor vessel can be relatively rapid and the vessel can be damaged notwithstanding the use of a rupture disc unless the differential pressure at which the disc bursts is selected to have a value which is not substantially greater than about 20%, for example, of the desired operating pressure. A safety factor of this order provides for response of the disc to the increasing pressure before destructive levels are reached.

While high pressure systems employing relief rupture discs having enhanced safety factors have provided satisfactory operation, the relatively narrow pressure difference between the operating pressure of the vessel and the burst pressure of the disc has rendered it unfeasible to operate the vessel over a range of various operating pressures without replacement of the rupture disc with one suitable for the desired new operating pressure. A rupture disc change of this nature has heretofore required a depressurization and purge of the complete system as well as a purging subsequent to changing the rupture disc in order to remove air from the unit after it has been exposed to atmosphere. This involves a relatively lengthy shutdown in the system which is costly in terms of lost production time.

Accordingly, it is an object of this invention to provide an improved pressure relief arrangement for a high pressure system.

Another object of the invention is to provide an improved form of rupture disc pressure relief arrangement for a high pressure system.

Another object of the invention is to provide a rupture disc form of pressure relief arrangement for a high pressure system which is adaptable for operation over a range of operating pressures.

A further object of the invention is to provide an improved rupture disc pressure relief arrangement for a high pressure system which can be utilized over a range of pressures and which eliminates the need for replacement of the disc when changing from one operating pressure to another.

In accordance with the general features of the present invention, a high pressure system includes a reactor vessel adapted for operating at a relatively high pressure, a rupture disc having first and second opposite surfaces thereof, a first surface of the rupture disc exposed to the internal pressure $P_r$ of the vessel, and means for establishing a variable pressure $P_o$ at the second surface of the rupture disc.

In accordance with more particular features of the invention, a second rupture disc having first and second opposite surfaces is provided. The first surface of the first rupture disc is exposed to the internal pressure $P_r$ of the vessel and the first surface of the second disc is exposed to a relatively lower pressure $P_a$. Means are provided for establishing the variable, intermediate pressure $P_o$ at said second surfaces of said rupture discs.

In accordance with further features of the invention, the means for providing an intermediate pressure $P_o$ at the second surfaces of the first and second discs is adapted for automatically varying this intermediate pressure in a manner for maintaining a differential pressure $\Delta P_D$ across the first disc at a substantially constant magnitude when the operating pressure $P_{ro}$ of the vessel is altered from one predetermined level to another predetermined level. Means are also provided for detecting an undesired and excessive increase in the internal pressure $P_r$ of the vessel above the operating level $P_{ro}$ and for limiting the intermediate pressure $P_o$ to a predetermined value as the vessel pressure rises. The pressure differential $\Delta P$ is then permitted to increase thereby causing the sequential bursting of the first and second discs and the release of internal vessel pressure before damage to the vessel occurs.

These and other objects and features of the invention will become apparent with reference to the following specification and to the drawings wherein.

Figure 1:
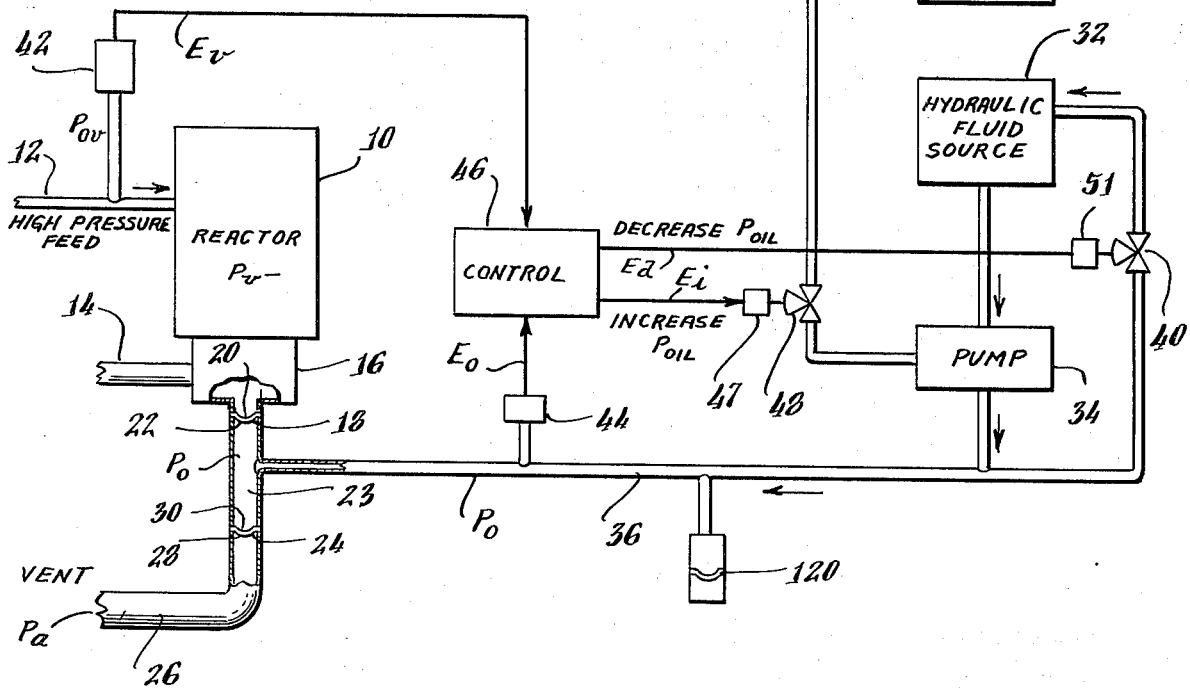
FIG. 1 is a schematic diagram illustrating a high pressure reactor system having a pressure relief arrangement constructed in accordance with features of the present invention.

Referring now to FIG. 1, there is illustrated a high pressure process arrangement, as for example, an ethylene polymerization process which employs a reactor vessel 10. A material is charged to the vessel at a relatively high pressure and the reactions which take place within the vessel 10 occur at a relatively high pressure. The vessel is accordingly constructed so as to withstand pressures which can extend up to about 40,000 PSI. The reactor is charged with a feed material, such as ethylene, through an input conduit 12. The reaction products can be withdrawn from the vessel through an outlet conduit 14 which is formed in an outlet block 16 of the vessel. A knowledge of the reaction process and control of the feed changing pressure permit the operating pressure $P_{ro}$ of the vessel to be predetermined. The operating pressure $P_{ro}$ can be altered in a controlled manner by changing the operating parameters of the process, the feed material or the pressure $P_{ro}$ can be varied by changing the reaction process itself.

The vessel is protected from runaway reactions and self-destruction by a rupture disc pressure relief arrangement which comprises a first rupture disc 18 mounted to the outlet block of the vessel and having a first surface 20 thereof exposed to the internal pressure, $P_r$, of the vessel. Means are provided for establishing a variable pressure $P_o$ at a second opposite surface 22 of this disc. The disc 18, although having a predetermined rupture or burst pressure characteristic can be employed over a range of vessel operating pressures $P_{ro}$ by providing a pressure $P_o$ at the surface 22 which varies in a manner for maintaining a pressure differential $\Delta P_D$ across the disc 18 substantially constant as the operating pressure $P_{ro}$ is varied from a first level to another. The pressure $P_{ro}$ will be varied in a controlled manner, for example, when changing from one process reaction to another. A means is provided for both confining a fluid, which establishes the pressure $P_o$ at the surface 22, and for venting the vessel 10 when the disc 18 bursts during a runaway reaction. This means is shown to comprise a second disc 24, a tube 23 extending between the discs 18 and 22, and a vent pipe 26. A first surface 28 of the disc 24 is exposed to a downstream venting pressure, $P_a$, such as atmospheric pressure while a second surface 30 thereof is exposed to the intermediate pressure $P_o$ which is also applied to the surface 22 of the disc 18. The intermediate pressure $P_o$ is established at the surfaces of the discs 18 and 24 by a fluid such as a synthetic oil which is derived from a source 32 and is conveyed under pressure by a pump 34 via a conduit 36 and a tube 23 to the second surfaces of the discs 18 and 24. The intermediate pressure $P_o$ is automatically variable and is increased through operation of the pump 34 and is decreased through operation of a pressure bleed valve 40 which is coupled between the conduit 36 and the fluid source 32. As described in greater detail hereinafter, the pressure $P_o$ is automatically increased through operation of the pump 34 as the operating pressure $P_{ro}$ within the vessel 10 is increased, and, is automatically decreased through operation of the valve 40 when the operating pressure $P_{ro}$ within the vessel 10 is decreased.

An important feature of the present invention is the use over a relatively large range of operating pressures of a rupture disc 18 having a predetermined rupture or burst pressure characteristic. As indicated hereinbefore, it is generally preferable that the rupture disc exhibit a burst characteristic at a pressure of about 120% of the vessel operating pressure $P_{ro}$. The rupture disc 18 is selected to provide this desired burst characteristic for operating pressures near the relatively low end of the vessel's operating pressure range. At this low operating pressure, the intermediate pressure $P_o$ is substantially near a vent pressure $P_a$ and a pressure differential, $\Delta P_D$, which is established across the disc 18 under these conditions is equal to the lowest operating pressure of the vessel. As the operating pressure $P_{ro}$ of the vessel is increased to a higher operating level, the pressure $P_o$ is automatically increased in order to maintain the pressure differential $\Delta P_D$ substantially constant over the range of operating pressures thereby inhibiting rupture of the disc 18. Similarly, as the operating pressure $P_{ro}$ is decreased from a relatively high level, the pressure $P_o$ is automatically decreased in order to maintain $\Delta P_D$ constant. The intermediate pressure regulating means automatically satisfies the relation: $\Delta P_D = P_{ro} - P_o = k$ until a runaway condition is sensed. At that time, however, further increases in $P_o$ are inhibited thereby permitting $\Delta P_D$ to increase and to cause a rupture of the disc.

Figure 4:
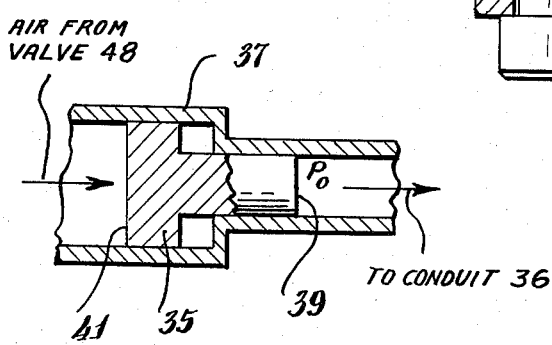

The intermediate pressure $P_o$ is varied automatically to accommodate desired changes in vessel operating pressure $P_{ro}$ by a pressure control arrangement. Referring once again to FIG. 1, a pressure-voltage transducer 42 is provided which generates an electrical output signal $E_r$ having an amplitude which is proportional to the magnitude of the internal pressure of the vessel 10. This transducer is coupled to the reactor vessel 10 at the high pressure feed conduit 12. Similarly, a pressure-voltage transducer 44 is coupled to the conduit 36 and an output voltage $E_o$ thereof is proportional to the intermediate pressure $P_o$ in the conduit 36 at the face 22 of the disc 18. These signals are applied to a control means 46 which compares the signals and causes operation of the pump 34 or the valve 40 in order to maintain the pressure differential $\Delta P$ constant as the vessel pressure $P_r$ is varied. As the vessel pressure $P_r$ is increased, the control means 46 actuates the pump 34. The pump 34 (FIG. 4) comprises, for example, a pressure intensifier pump arrangement including a piston 35 positioned within a cylinder 37 and having high and low pressure piston faces, 39 and 41 respectively. A signal $E_i$ from the control means 46 is applied to a voltage to pneumatic transducer 47 which energizes flow control valve 48. Air pressure from a source 50 is thereby applied to the low pressure face 41 of the intensifier pump piston. This causes movement of the intensifier piston, compression of the hydraulic fluid, and an increase in the pressure $P_o$ until the above-enumerated pressure relationships are attained. In a similar manner, the control means 46, upon detecting a decrease in the internal pressure $P_r$ of the vessel 10, will provide a signal $E_a$ which is applied to a voltage to pneumatic transducer and which energizes the pressure bleed valve 40. This valve bleeds a portion of the hydraulic fluid from the line thereby decreasing the pressure $P_o$. This valve is similarly automatically controlled until the desired pressure relationships are established.

In addition, the control means 46 include means for inhibiting further increases in the pressure $P_o$ when the vessel pressure $P_r$ exceeds the established operating pressure $P_{ro}$. As the vessel pressure $P_r$ exceeds the operating level $P_{ro}$, a runaway condition is indicated. The control means 46 maintains the pressure $P_o$ constant and the further increase in the vessel pressure $P_r$ causes the differential pressure $\Delta P$ to rise and to exceed 120% of the operating pressure. The disc 18 will then burst and pressure will be momentarily applied to the disc 24 which sequentially bursts and vents the vessel to the pressure $P_a$.

Figure 2:
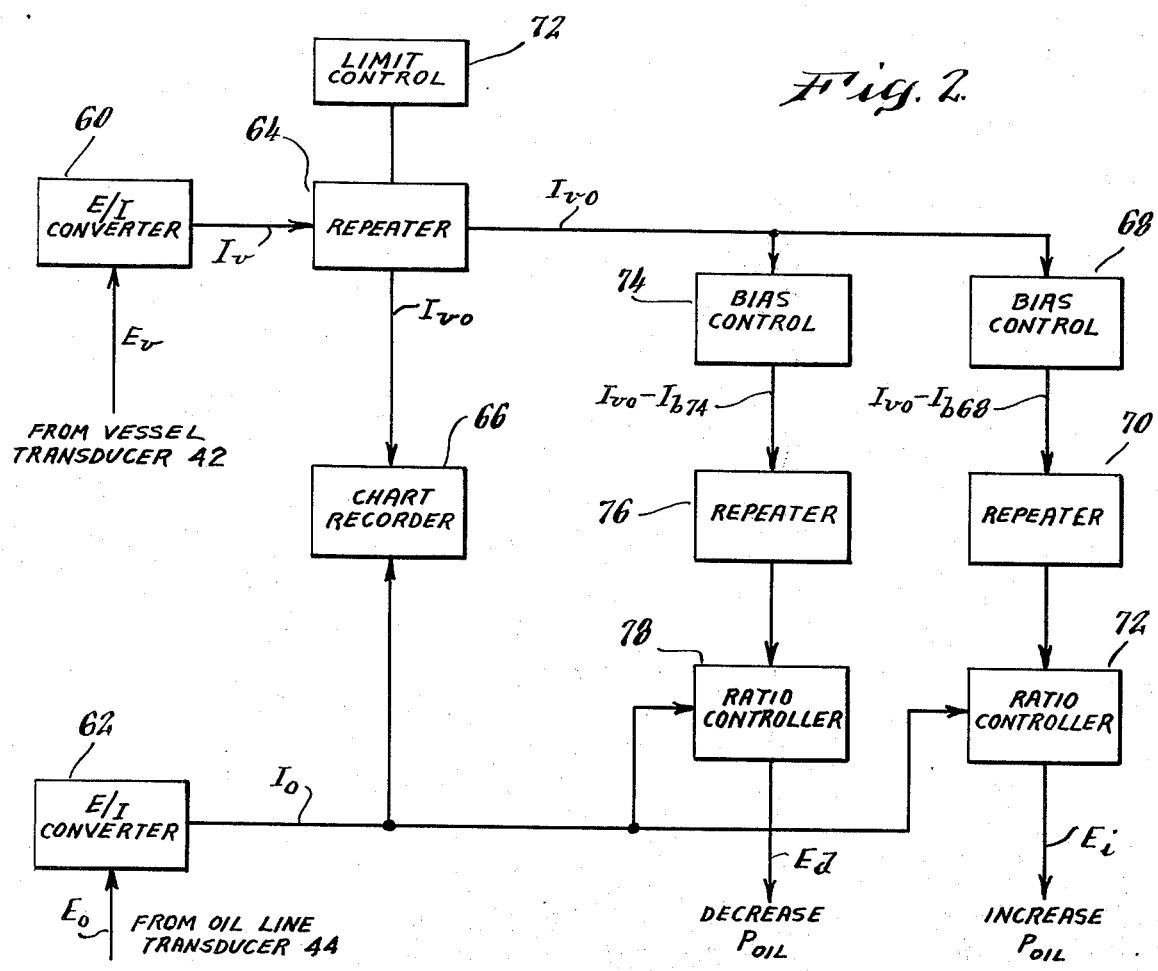
FIG. 2 is a more detailed block diagram of a pressure control arrangement utilized with the system of FIG. 1.

There is illustrated in FIG. 2 a more detailed diagram of the control arrangement 46 of FIG. 1. The voltage $E_r$ which is derived from the transducer 42 and which has an amplitude representative of the pressure within the vessel 10 is provided at a relatively low voltage level. For example, the voltage level may be within the range of about 0 to 8 millivolts. This signal is initially applied to a voltage to current converter 60 which provides noise rejection and amplification to an output current level within the range of about 10 to about 50 ma. The voltage $E_o$ which is derived from the transducer 44 and which has an amplitude proportional to the oil pressure $P_o$ is applied to a similar voltage to current converter 62. The output $I_r$ of the converter 60 is coupled to an amplifying repeater 64. One output $I_{ro}$ from the repeater 64 is applied to a chart recorder 66 along with the output $I_o$ from the converter 62. The recorder 66 utilizes these inputs to provide a charted indication of variations occurring in the vessel pressure and in the oil line pressure.

The repeater 64 is adapted to provide both amplification and amplitude limiting. A manually adjusting limiter control 72 is provided for use by an operator. The operator, by adjusting a potentiometer, establishes an upper amplitude limit for the output current $I_{ro}$. Input currents, $I_r$, which would generate higher output currents than the limited value in a linear mode of operation represent excessive vessel pressures. When the input current attains this level, further increases in the amplitude $I_{ro}$ are inhibited. Since the pressure $P_o$ is regulated in accordance with changes in $I_{ro}$, a limited output current $I_{ro}$ will maintain $P_o$ at a constant level. Thus, as the vessel pressure $P_r$ becomes excessive, further increases in $P_o$ are automatically inhibited above the limit point. The pressure $\Delta P_D$ will no longer be regulated at a constant value but will increase to the burst point as the vessel pressure $P_r$ increases.

The output signal $I_{ro}$ from the repeater 64 is applied to a first control arrangement including a bias control circuit 68, a repeater 70 and a ratio controller 72. This control arrangement operates to increase the pressure $P_o$ as the operating pressure $P_{ro}$ is increased in a controlled manner. The signal $I_{or}$ of repeater 64 is also applied to a circuit arrangement including a bias control means 74, a repeater 76 and a controller 78 which operates to decrease the pressure $P_o$. The desired pressure differential $\Delta P_D$ across the disc 18 is established by the bias control arrangements 68 and 74. These each comprise circuit means for combining the signal $I_{ro}$ with a bias current $I_b$ having a magnitude which is proportional to the magnitude of the differential pressure $\Delta P_D$. More particularly, the bias circuits subtract a bias signal and the outputs from the circuits 68 and 74 therefore comprise the signals $I_{ro} - I_{b68}$ and $I_{ro} - I_{b74}$ respectively. It will be noted from the control equation referred to hereinbefore that this function is equivalent to the desired variation in oil pressure $P_o$ as the operating pressure $P_{ro}$ is varied. The electrical signal $I_{ro} - I_{b68}$ which is representative of the desired oil pressure $P_o$ in accordance with the above equation is applied via a repeater 70 to the controller 72 for comparison with the amplitude of the detected oil pressure represented by the current $I_o$. When these inputs are equal in amplitude, their ratio is equal to 1. This correspondence is detected and signifies that the desired differential pressure $\Delta P_D$ exists across the disc 18 and an increase in oil pressure $P_o$ is unnecessary. On the other hand, when the ratio is greater than 1, the controller 72 provides an output signal $E_r$ which causes actuation of the valve 48 and operation of the pump 34 until the oil pressure $P_o$ is increased to a value at which the ratio attains a value 1. Similarly, when the ratio is less than 1, the controller 78 provides an output for activating the bleed valve 40 and decreasing the oil pressure $P_o$ until a one-to-one ratio is reestablished. In order to inhibit interaction between the control loop comprising the units 74, 76, and 78, the bias control means 68 and 74 adjusted to provide a slightly different bias between $I_{b68}$ and $I_{b74}$. This provides a slight separation in the magnitude of the differential pressure $P_D$. For example, the bias control circuit 68 will be adjusted in order to provide a bias equivalent to a differential pressure of 21,000 PSI while the bias control circuit 74 will be adjusted to provide a differential pressure bias of 21,500 PSI.

In addition to automatically regulating the pressure $P_o$ as the operating pressure of the vessel 10 is altered, the control system automatically provides for the interruption of regulation when a runaway pressure condition occurs in the vessel 10. A potentiometer in the limit control means 72 is manually adjusted by an operator for establishing a maximum output signal amplitude from the limiter which is representative of a maximum safe pressure level to which the vessel pressure $P_r$ can rise. As the input signal $I_r$ to the repeater 64 increases to this level the output signal $I_{ro}$ from the repeater 64 will correspondingly increase and the control function provided by the components 68, 70 and 72 will operate to cause an increase in the oil pressure. However, as the limit level is reached, further increases in the input signal $I_r$ to the repeater 64 will not be followed by an increase in the output signal $I_{ro}$ from this repeater and the pressure $P_o$ attained as the limit value was reached will not increase any further in amplitude. Thus, as the limit value is reached, the control function is interrupted and the oil pressure $P_o$ is held at an upper value. The pressure differential $P_D$ across the disc is then no longer controlled so as to be maintained at a substantially constant value and further increases in the vessel pressure $P_r$ will result in an increase in this differential pressure until the internal pressure $P_r$ attains the 120% level of $P_{ro}$. At this point, the disc 18 and the disc 24 will sequentially burst and vent the vessel to atmosphere.

While various circuit arrangements may be employed with the regulator of FIG. 2, it has been found that the following commercially available units provide satisfactory performance. The units are available from the Foxboro Manufacturing Company of Foxboro, Massachusetts and comprise: converters 60 and 62, Model 693AR EMF-to-current converter; bias controls 68 and 74, Model 678HZG; repeaters 64, 70 and 76, Model 66BT with high limit adjustment; and ratio controllers 72 and 78, Model No. 62H electronic consotrol controllers.

Figure 3:
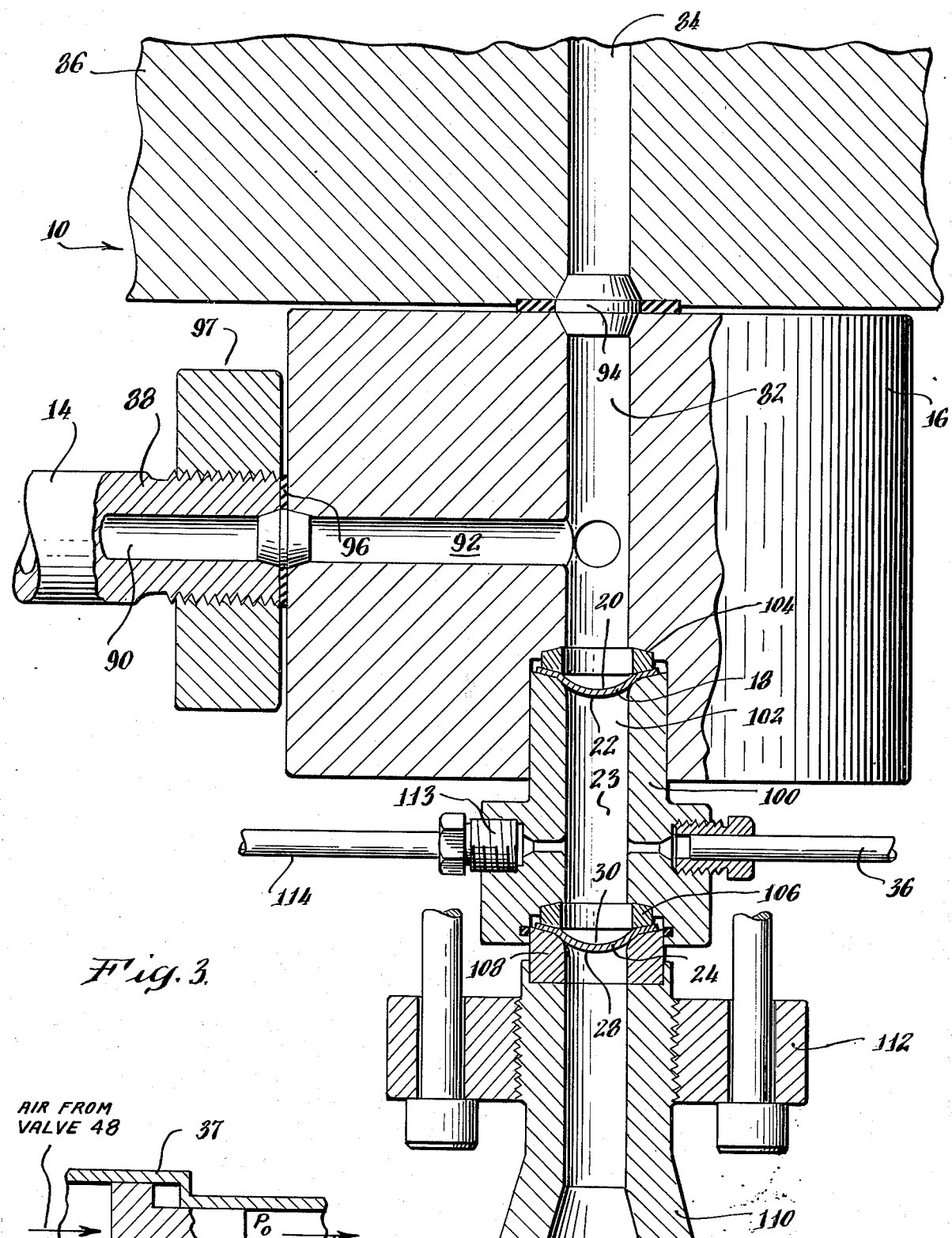
FIG. 3 is an enlarged sectional view illustrating a rupture disc arrangement utilized with the pressure relief system of FIG. 1; and, FIG. 4 is a view in section of a portion of a pressure intensifier pump.

There is illustrated in detail in FIG. 3 an embodiment of a rupture disc arrangement in accordance with the present invention. The output block 16 communicates via a channel 82 with a channel 84 formed within a lower segment 86 of the vessel 10. The outlet line 14 of FIG. 1 is shown to comprise a tubulation 88 which is mounted to the block 82 and which includes a channel 90 communicating with the channel 82 via a channel 92. A high pressure seal ring 94 is provided and is positioned between the outlet block 16 and the vessel segment 86. A similar high pressure seal ring 96 is positioned between a mounting flange 97 and the block 80.

The rupture disc assembly includes a body 100 having integrally formed therein a channel 102 which is terminated at one end by the first rupture disc 18 across which the differential pressure $\Delta P_D$ is established and at an opposite end by the second rupture disc 24. The rupture discs comprise thin, disc-shaped bodies formed of a metal such as steel and having a predetermined mechanical rupture characteristic. The disc 18 is positioned between a cone ring 104 and the body 100 while the disc 24 is positioned between a cone ring 106 and a disc support body 108. This assembly is mounted to the output block 16 by an adapter member 110 which is forced against the disc body 108 by a screw-mounted flange 112. Hydraulic fluid at a pressure $P_o$ is conveyed to the volume 23 through conduit 36. A tap 113 is provided for coupling the transducer 44 (FIG. 1) to the volume 23. A conduit 114 extends between the tap 113 and the transducer.

Referring once again to FIG. 1, an oil pressure rupture disc 120 is provided and one surface thereof is exposed to the pressure $P_o$ in line 36. This disc is provided in order to protect the system against malfunctions arising in the regulating system wherein the pressure $P_o$ may rise to a level sufficiently high for permitting the internal vessel pressure $P_r$ to exceed 120% of the operating pressure $P_{ro}$. This disc therefore provides a positive safeguard against malfunctioning in the oil pressure regulating system. The disc 120 may be readily installed by an operator in preparation for a change in the operating pressure of the vessel 10.

An improved pressure relief arrangement for a vessel in a high pressure system has thus been described. The system utilizes a rupture disc pressure relief technique and permits the operation of the vessel over a relatively wide range of pressures while eliminating the need for replacing the rupture disc during such change and substantially reduces the cost of the process by eliminating down time for replacement of the disc. The described system is further advantageous in that it automatically provides for maintaining a predetermined differential pressure across the rupture disc.

While we have described various embodiments and features of the invention, it will be appreciated that variations may be made thereto by those skilled in the art without departing from the spirit of the invention and the scope of the appended claims.

What is claimed is:

1. In a high prerssure apparatus including a reaction vessel for operating at relatively high and variable reaction pressures, an improved pressure relief assembly comprising:
   a body having first and second opposite surfaces and possessing a predetermined mechanical rupture characteristic whereby the body will rupture when a predetermined pressure differential exists between said first and second surfaces;
   means for positioning said body so that said first surface thereof is exposed to the relatively high reaction pressure within said vessel;
   means for applying to the second surface of said body a partial counter pressure which is responsively adjusted in line with changes in said reaction pressure within said vessel so that the differential pressure between said first and second surface is held below the rupture level; and
   means for detecting a runaway pressure increase in said reaction pressure and thereupon deactivating further increases in said counter pressure.

2. The improved pressure relief assembly of claim 1 wherein said means for applying to the second surface of said body a partial counter pressure comprises a volume of confined fluid within a system which includes said second surface of said body and means for varying the pressure of said fluid in response to said changes in said reaction pressure within said vessel.

3. The improved pressure relief assembly of claim 2 wherein said system includes a second body having first and second opposite surfaces and possessing a predetermined mechanical rupture characteristic and one of these opposite surfaces is in contact with the fluid withing said system while the other is exposed to an atmosphere at a relatively lower pressure.

4. The apparatus of claim 1 wherein said means for varying the pressure of said confined fluid includes a fluid pump which communicates with said confined fluid and with a fluid reservoir, means for actuating said pump for increasing said pressure when the reaction pressure within said vessel is increased, means coupled to said confined fluid for reducing the pressure thereof, and means for actuating said pressure reducing means when the reaction pressure within said vessel is reduced.

5. The apparatus of claim 4 wherein said pump comprises a fluid pressure intensifier.

6. The apparatus of claim 4 wherein said means for reducing said pressure comprises a valve coupled between said confined fluid and said reservoir.

7. The apparatus of claim 4 wherein said fluid comprises a liquid.

8. The apparatus of claim 4 including a third rupture body having first and second surfaces thereof and having a predetermined mechanical rupture characteristic, means for supporting said body for exposing said first surface of said third body to said fluid medium and for exposing said second surface of said third body to a relatively lower pressure.

9. The apparatus of claim 5 wherein said intensifier pump includes a piston having a relatively low pressure face and a relatively high pressure face, means for providing communication between said high pressure face and said fluid, a source of pressurized gas, means for providing a flow path between said source of pressurized gas and said low pressure face, a flow control valve positioned within said flow path for controlling the flow of gas from said source to said low pressure face and means for operating said control valve for increasing the flow of pressurized gas to said low pressure face when the pressure within said vessel increases.

10. A high pressure system having an improved pressure relief arrangement comprising:
   a vessel for operating at a relatively high pressure;
   means for increasing the pressure within said vessel in a controlled manner;
   a first rupture disc having first and second surfaces thereof having a predetermined mechanical rupture characteristic,
   said first disc having a mechanical rupture characteristic whereby the disc will rupture when a predetermined differential pressure is applied between said surfaces;
   a second rupture disc having a predetermined rupture characteristic and first and second surfaces thereof, said second rupture disc adapted for rupturing at a relatively lower differential pressure than said first disc;
   means for positioning and exposing said first surface of said first disc to the internal pressure $P_r$ of said vessel;

means for positioning and exposing said first surface of said second disc to a pressure $P_a$ which is relatively lower than the pressure within said vessel;

means including said second surfaces of said first and second discs for confining a hydraulic fluid;

means for pressurizing said fluid at a pressure level $P_o$ which is intermediate the relatively higher pressure $P_r$ of said vessel and the relatively lower pressure $P_a$ to which said first surface of said second disc is exposed;

said means for pressurizing said fluid including means for increasing the pressure of said confined fluid when the pressure within said vessel is increased in a controlled manner and for decreasing the pressure of said confined fluid when the pressure within said vessel is decreased in a controlled manner, said means for increasing and decreasing the fluid pressure including electrically energized flow control means.

11. The high pressure system of claim 10 where said electrically energized flow control means include:

a first transducer coupled to said vessel for providing an electrical output signal which is proportional to the pressure within said vessel;

a second transducer coupled to said means for confining said fluid for providing an output signal which is proportional to the pressure of said confined fluid;

means for combining the output of said first transducer with an electrical bias, said electrical bias having an amplitude which is proportional to a predetermined differential pressure which is below the rupture level differential pressure for said first disc;

means for forming the ratio between the latter signal and said electrical signal proportional to the pressure of said confined fluid and for providing an output signal which increases said confined fluid pressure when the pressure within said vessel increases and which decreases said confined fluid pressure when the pressure within said vessel decreases; and means for inactivating the means for pressurizing said confined fluid whenever the output signal from said first transducer exceeds a preestablished level.

* * * * *